(12) United States Patent
Andersson et al.

(10) Patent No.: US 6,853,908 B2
(45) Date of Patent: Feb. 8, 2005

(54) SYSTEM AND METHOD FOR CONTROLLING AN OBJECT DETECTION SYSTEM OF A VEHICLE

(75) Inventors: Hans Andersson, Molndal (SE); Martin Apelryd, Gothenburg (SE)

(73) Assignee: Ford Motor Company, Dearborn, MI (US)

(*) Notice: Subject to any disclaimer, the term of this patent is extended or adjusted under 35 U.S.C. 154(b) by 4 days.

(21) Appl. No.: 10/271,247

(22) Filed: Oct. 15, 2002

(65) Prior Publication Data
US 2003/0093220 A1 May 15, 2003

(30) Foreign Application Priority Data
Oct. 15, 2001 (EP) ............................................. 01124586

(51) Int. Cl.[7] ........................ G01C 21/26; G01C 21/28
(52) U.S. Cl. ........................ 701/207; 701/208; 701/211; 701/214; 701/300; 340/438; 340/903
(58) Field of Search ................................. 701/300, 301, 701/1, 200, 207, 208, 211, 212, 213, 214; 340/901, 903, 438, 439

(56) References Cited

U.S. PATENT DOCUMENTS

| | | | |
|---|---|---|---|
| 6,108,602 A | 8/2000 | Bairamis | |
| 6,161,071 A | 12/2000 | Shuman et al. | |
| 6,191,704 B1 | * 2/2001 | Takenaga et al. | ............ 340/903 |
| 2002/0198660 A1 | * 12/2002 | Lutter et al. | ................ 701/301 |

FOREIGN PATENT DOCUMENTS

| | | |
|---|---|---|
| EP | 1043193 A | 10/2000 |
| EP | 1098168 | 5/2001 |
| EP | 1120631 A | 8/2001 |
| JP | 04201712 | 7/1992 |
| JP | 10221451 | 8/1998 |

\* cited by examiner

*Primary Examiner*—Gertrude A. Jeanglaude
(74) *Attorney, Agent, or Firm*—Brooks & Kushman, PC.

(57) ABSTRACT

A system is disclosed for controlling an object detection system of a land based vehicle, having at least one detection device with a limited geometrical operating area. The system comprises a computing device using information regarding the current or upcoming road situation from an on-board map database as input for computing an attention plan for optimizing the use of the at least one detection device in the object detection system, said attention plan being outputted to the object detection system for control of said detection device. Further, a method is disclosed which relates to controlling an object detection system.

18 Claims, 2 Drawing Sheets

SYSTEM AND METHOD FOR CONTROLLING AN OBJECT DETECTION SYSTEM OF A VEHICLE

FIELD OF THE INVENTION

The invention relates to a system for controlling an object detection system of a vehicle, having at least one detection device with a limited geometrical operating area. It also relates to a method for controlling an object detection system.

BACKGROUND OF THE INVENTION

Within the vehicle industry, object detection systems are used for detecting objects in the environment surrounding the vehicle, such as solid or movable obstacles, other vehicles, etc. Normally, the object would be detected via one or several of a multiple of object detection sensors of the vehicle. Examples of such object detection sensors are radars, lasers, and color cameras. Also, the object detection system might include enlightenment devices or display devices that make a visual examination of the surrounding environment possible. The object detection system may connected to other systems for automatic collision warning, enlightenment steering, etc.

It has also been proposed that map databases including information regarding road characteristics such as curvature, speed limit, etc. could be used together with object detection systems, for example for determining the nature of an obstacle approached by a vehicle. (Otherwise, systems using geographic map databases are commonly used as navigation aid systems for drivers of vehicles.)

U.S. Pat. No. 6,161,071 (Shuman) describes a computing architecture for a motorized land-based vehicle. The computing architecture includes a data network comprised of a plurality of interconnected processors, a first group of sensors responsive to environmental conditions around the vehicle, a second group of sensors responsive to the vehicle's hardware systems, and a map database containing data that represent geographic features in the geographic area around the vehicle. A vehicle-environment modelling program, executed on the data network, uses the outputs from the first and second group of sensors and the map database to provide and continuously update a data model that represents the vehicle and the environmental around the vehicle, including geographic features, conditions, structures, objects and obstacles around the vehicle. Vehicle operations programming applications, executed on the data network, use the data model to determine desired vehicle operation in the context of the vehicle's environment. The vehicle operations programming applications may include adaptive cruise control, automated mayday, and obstacle and collision warning systems, among others. EP 1 098 168 (Chojnacki) describes a system for collecting data for automatic generation of shape and curvature data of roads for a geographic database. The information stored in the database could for example be used for headlight aiming or curve warning.

JP 10 221 451 (Yoshiyuki) describes a system for identifying whether an object detected by a vehicle mounted radar is an obstacle or not.

In these prior systems, information retrieved from the object detection system is compared to the information in the map database for updating of the database or identification of the detected object.

However, with existing object detection systems (with or without connection to map databases) there are problems resulting from the limited resolution and detection area of the sensors of the system. Most available sensors can only acquire a clear picture of the road ahead in a relatively small area. In a broad area, only a rough picture of the road is available. Thus the detection capacity of the system is limited.

The resolution could theoretically be increased by selecting more expensive hardware, such as camera systems performing saccadic movements, or simply by multiplying the number of sensors. However, these options result in severely increased costs for the system, making the system less affordable to the customer.

Since most object detection systems operate in real-time or close to real-time, the processing of the data received from the object detection sensors must be fast. However, the data flow to be processed from, for example, radars, lasers, and especially color cameras is very extensive. A known method to speed up the processing is to allocate more processing capacity to areas in the complete picture frame of the sensors where objects were recognised in a previous picture frame than to areas where no object was detected. However, this method has the disadvantage that recognition of objects appearing for the first time in a new area of the picture frame will be delayed.

Another prior known way of allocating the attention of the object detection sensors in a picture frame is using input of other sensors of the vehicle, such as sensors indicating the vehicle speed, yaw rate, and pitch. These parameters could be combined to estimate the most favorable allocation of the detection sensors.

An object of the present invention is to provide a system for enhancing the function of an object detection system.

SUMMARY OF THE INVENTION

According to the invention, the above object is achieved by a system comprising a computing device using information regarding the current or upcoming road situation from a map database as input for computing an attention plan for optimising the use of the at least one detection device in the object detection system, said attention plan being outputted to the object detection system for control of said detection device.

The map database could provide road section attributes relevant for the control of the operating device. Attributes describing, for example, road geometry (curves and vertical curvature), lanes, intersection geometry, road signs etc are used for assessments of which traffic environment objects are most likely to appear.

Detection devices in an object detection system could be various types of devices providing some kind of detection signal, for example scanning sensors, such as radar- and laser sensors, or cameras.

Radar and laser sensors normally have a limited geometrical operating area defined by their operating angle and maximum operating length. Cameras may have a rather wide maximum operating picture frame. However, due to their limited resolution capacity, one must normally select a smaller picture area within the picture frame if a better resolution of an object is needed, i.e., zooming.

When optimizing the use of a detection device having a limited geographical operating area this may for example include the direction of the operating area, selection of a zooming area, selection of resolution or of processor resources allocated to the detection device. Other optimizing criteria may be used depending on the nature of the detection device and the current environment situation.

Advantageously, one or more detection devices may be directable. In such case, the attention plan is generated so as to control the direction of the devices.

If several detection devices are used, the attention plan could be generated so as to allocate processor or power recourses between them. This is particularly important if devices demanding a large amount of processor capacity are used, such as cameras.

Advantageously, several detection devices of different types may be used. In that case, the attention plan could preferably be generated using different algorithms for different types of devices. This is useful since different device technologies have different characteristics and often are used for different purposes.

According to an embodiment of the invention, the map database is provided on-board a vehicle. This is advantageous since the time for retrieving road section attributes to the computing device is shortened as compared to an outer map database, thus contributing to minimizing the response time of the entire system. Further, the onboard location ensures continuous contact with the object detection system and thus a stable performance.

According to a further embodiment of the invention, the system is improved in that said computing device uses output from said at least one detection device as input together with said information from the on-board map database to calculate the attention plan. Such a system has the advantage that both stationary objects, which appear in the map database and in the output of the detection devices, and moving objects, which appear only in the output of the sensors, are used to optimize the use of the detection devices.

The above mentioned object is also achieved by a method for controlling an object detection system of a vehicle, said object detection system having at least one detection device with a limited geometrical operating area, the object detection system being connected to a computing device which in turn is connected to a position input connection for receiving vehicle position information from a positioning system and to a map database, said method comprising the following steps being performed by the computing device:

receiving vehicle information via said position input connection, extracting, from said map database, map information relating to at least one of a current and an upcoming road section, based on said vehicle position information, generating, from said map information an attention plan for optimizing the use of said at least one detection device for at least one of the current and the upcoming road situation outputting said attention plan to the object detection system for controlling the at least one detection device.

Advantageously, said object detection system has at least one directable detection device having a limited geometrical operating area and said attention plan is generated to optimize the direction of said detection device.

Preferably, said object detection system has several detection devices each with a limited geometrical operating area wherein said attention plan is generated to optimize the allocation of process resources between said detection devices.

Also, if the object detection system has several detection devices each with a limited geometrical operating area and of at least two different types, then the generation of the attention plan can include different algorithms for the different types of detection devices.

According to one embodiment of the invention, it further includes the steps of retrieving, from the object detection system, information regarding the current object situation, generating from said map information and said object information, an attention plan for optimizing the use of said at least one detection device for at least one of the current and the upcoming road situations.

BRIEF DESCRIPTION OF THE DRAWINGS

A preferred embodiment of the present invention will now be described in closer detail with reference to the accompanying drawings.

DETAILED DESCRIPTION OF THE PREFERRED EMBODIMENTS OF THE INVENTION

Figure 1:
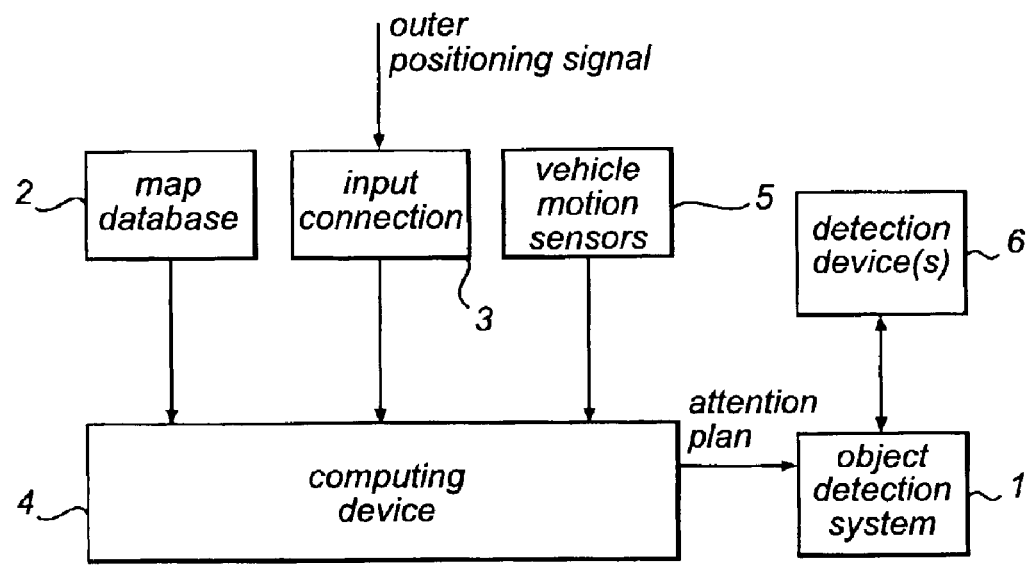
FIG. 1 is a block diagram of one embodiment of the invention.

In FIG. 1, a system in accordance with a first embodiment of the invention is shown in its working environment. The environment comprises an object detection system 1 that is associated to one or several detection devices 6 such as sensors or cameras. Most sensors have a limited geometrical operating area. This is the case with, for example, laser devices. Also, devices with a wider theoretical operating area, such as cameras, may need to be zoomed in order to retrieve a useful picture of an interesting area. In that sense, cameras also have a limited geometrical operating area.

Also, there is a map database 2 comprising information regarding road section attributes for a geographical area. Useful road section attributes are those that, for example, describe road geometry (curves and vertical curvature), lanes, intersection geometry, road signs, and other fixed obstacles that may be used for assessing in which part of the traffic environment an object being relevant for speed and steering control, obstacle collision warning, and the like, is likely to appear.

Further, there is an input connection 3 through which a positioning signal may be retrieved. The positioning signal may be a GPS signal for establishing the geographical location of the vehicle.

Finally, the system according to this embodiment of the invention comprises a computing device 4 using information regarding the current or upcoming road situation from the on-board map database 2 as input for computing an attention plan for optimizing the use of the at least one detection device 6 in the object detection system 1, said attention plan being outputted to the object detection system 1 for control of said detection device 6.

Also, information from vehicle-based vehicle motion sensors 5 regarding, for example, the vehicle speed, yaw rate, pitch and roll may be used as input to the computing device 4. This information is useful for determining the exact location and direction of the vehicle in the environment and thus useful to provide more accurate guidance of the detection devices 6.

Figure 2:
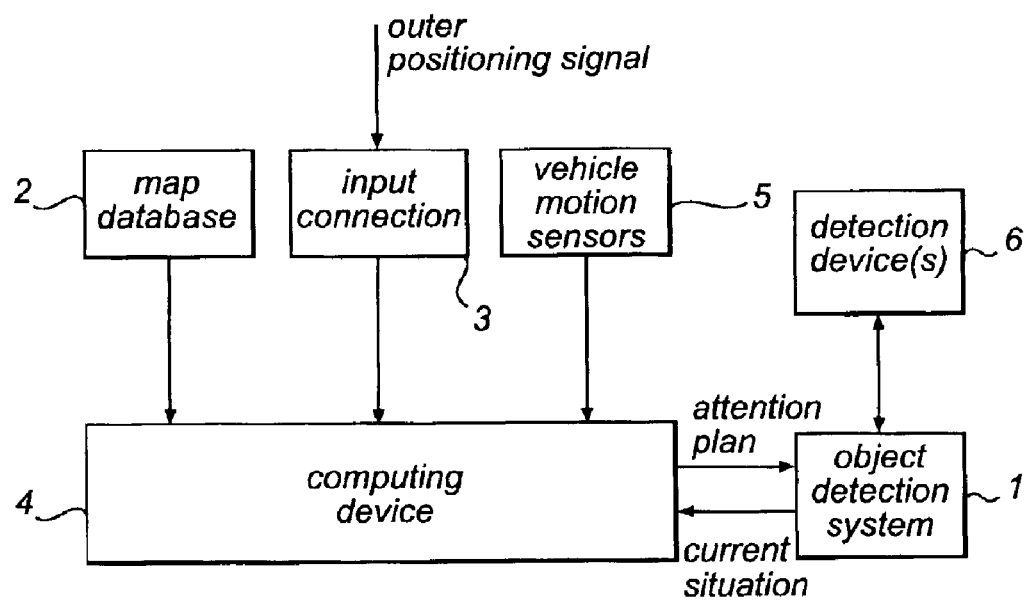
FIG. 2 is a block diagram of a second embodiment of the invention.

In FIG. 2, a block diagram of a second embodiment of the invention is shown. This embodiment differs from the embodiment of FIG. 1 in that information regarding the current situation is outputted from the object detection system 1 to the computing device 4 and used for generating the attention plan. This embodiment gives an opportunity to zoom in on moving objects in the environment. In FIG. 2, like features have been given the same reference numerals as in FIG. 1.

Figure 3:
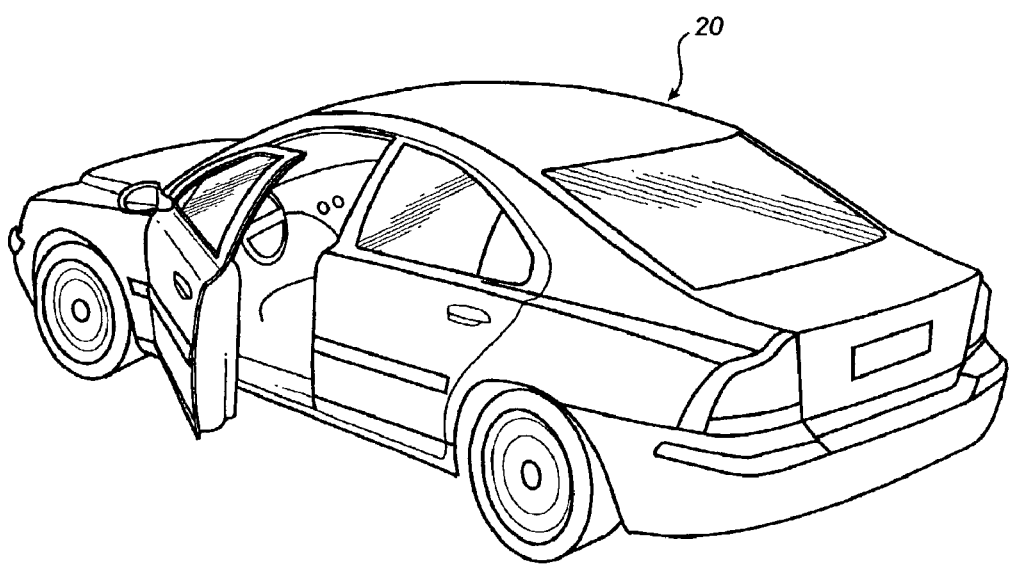
FIG. 3 is a perspective view of a vehicle comprising one embodiment of the invention.

In FIG. 3 a vehicle 20 comprising said object detection system is disclosed.

A few non-limiting examples of situations where the invention may be used will be described.

Radar and laser sensors used in Adaptive Cruise Control (ACC) systems and Forward Collision Warning (FCW) systems usually have a limited scanning angle, often about 22 degrees. This allows for good function in most situations on straight highways. However, on a curved road or in combination with lane changes, the target of these systems often falls out of the active scanning angle of the sensor and is lost. According to the invention, this problem is solved by using input from an on-board map database to generate an attention plan for controlling the direction of the sensors so that they capture the most relevant area of the road.

Color and black and white cameras are mostly used for capturing road markers and road borders by, for example, systems warning for running off the road or for steering aid systems. They can also be used for ACC, FCW or even automatic driving. The field captured by such cameras is limited first by the actual picture field. Also, in order to obtain a detailed picture, the resolution of the camera is a limitation. Normally, higher resolution may be obtained by sacrificing some of the picture field, that is by zooming. According to this embodiment of the invention, both the picture field and the zooming may be controlled via the attention plan generated using inputs from an on-board map database to enhance the performance of the camera.

IR-camera picture frames can be analysed for objects to support systems like ACC, FCW, lane tracking, etc., but mostly they are used for night vision. The camera view is then displayed on a screen in front of the driver or projected overlying the natural view on the windscreen. Because of the resolution limitation discussed above in relation to other types of cameras, the displayed night vision is very limited. A system according to the invention may here be used to select the most relevant sensor and display view.

For example, if the on-board map database information indicates that the vehicle is approaching a curve, the attention plan could be generated for adjusting for example the direction and scanning area of the relevant detection devices so as to follow the curvature of the road. Also, an upcoming vertical variation of the road such as a hill or drop in the road could result in vertical adjustment of the detection devices. A change in width of the road might also induce a change in the desired scanning area of the devices, as controlled by the attention plan. Further, if the road is changing to be a divided road with a median, the attention of the detection devices could be concentrated to the vehicle's side of the median, since vehicles on the other side of the median are not likely to be collision risks.

Further, if inputs from vehicle motion sensors indicating for example the vehicle's yaw, pitch and roll are used together with the map database to generate the attention plan, the detection device's active area could be optimized using those parameters. Other vehicle motion sensors such as forward speed and lateral speed could also be used. For example, when travelling in high speed the most interesting scanning area for collision warning is likely to be located further ahead of the vehicle than when travelling in low speed.

The more advanced variant of the invention, where output from the object detection system 1 is used as input to generate to attention plan, may be used with all of these examples. In addition to controlling detection devices, the attention plan could be generated to control other devices having a limited geometrical operating area. For example, the headlights of the vehicle could be controlled so as not to dazzle drivers of an approaching vehicle, even if the meeting lane of the road should normally be illuminated by the headlights.

Other embodiments of the system are realisable within the frame of the present invention. For example, different detection devices may be used. Also, generation of the attention plan may be adjusted to different situations and specific requirements of the detection devices used.

What is claimed is:

1. A system for controlling an object detection system of a vehicle comprising: at least one detection device with a limited geometrical operating area, a positioning device, said positioning device being capable of determining an approximate position of said vehicle, a map database, said map database being capable of determining a road situation related to said approximate position of said vehicle, and a computing device, said computing device being capable of generating an attention plan based on said road situation, wherein said attention plan is utilized by said object detection system in order to direct said at least one detection device.

2. The system of claim 1, wherein said attention plan is generated to optimize the direction of said at least one detection device.

3. The system of claim 1, further comprising at least one additional detection device, wherein said attention plan is utilized by said object detection system in order to direct said at least one additional detection device.

4. The system of claim 1, further comprising at least one additional detection device, wherein said at least one detection device and said at least one additional detection device are of different types.

5. The system of claim 1, wherein said attention plan is further based on an output from said at least one detection device.

6. The system of claim 1, further comprising at least one on-board vehicle motion sensor, wherein said attention plan is further based on an output from said at least one on-board vehicle motion sensor.

7. A system according to claim 1, wherein said map database is provided on-board said vehicle.

8. A method for controlling an object detection system of a vehicle comprising: determining an approximate position of said vehicle, determining a road situation from a map database related to said approximate position of said vehicle, generating an attention plan based on said road situation, and directing at least one detection device of said object detection system based on said attention plan.

9. The method of claim 8, wherein said attention plan is generated to optimize said directing of said at least one detection device.

10. The method of claim 8, further comprising the step of directing at least one additional detection device.

11. The method of claim 8, further comprising the steps of retrieving an object situation from said object detection system, and presenting said object situation to at least a driver of said vehicle.

12. The method of claim 8, further comprising the step of retrieving an object situation from said object detection system, wherein said directing said at least one detection device of said object detection system is further based on said object situation.

13. The method of claim 8, further comprising the step of retrieving a vehicle motion situation from at least one vehicle motion sensor, wherein said directing said at least one detection device of said object detection system is further based on said motion situation.

14. The method of claim 8, wherein said map database is provided on-board said vehicle.

15. The method of claim 1, wherein said attention plan directs a zooming of said detection device.

16. The method of claim 1, wherein said attention plan directs a resolution of said detection device.

17. The method of claim 1, wherein said detection device is movable to change its direction of focus, and wherein said attention plan directs said device to point in a desired direction.

18. The method of claim 17, wherein said desired direction is based on a speed of said vehicle.

* * * * *